(12) United States Patent
Bartlett, Jr. et al.

(10) Patent No.: US 7,500,435 B2
(45) Date of Patent: Mar. 10, 2009

(54) FRICTION DRIVE SYSTEM AND METHOD FOR PALLETIZED CONVEYOR

(75) Inventors: Samuel Bartlett, Jr., Marysville, OH (US); David Betz, West Jefferson, OH (US); Dave Dillard, Marysville, OH (US); Jason Harrison, Marysville, OH (US); Wayne Hemmelgam, Celina, OH (US); Jerry Maynard, Delaware, OH (US); Norm Schrake, Prospect, OH (US)

(73) Assignee: Honda Motor Co., Ltd., Tokyo (JP)

( * ) Notice: Subject to any disclaimer, the term of this patent is extended or adjusted under 35 U.S.C. 154(b) by 316 days.

(21) Appl. No.: 11/278,235

(22) Filed: Mar. 31, 2006

(65) Prior Publication Data

US 2007/0283839 A1    Dec. 13, 2007

(51) Int. Cl.
*B61B 9/00* (2006.01)
*B61B 13/00* (2006.01)

(52) U.S. Cl. ..................................... 104/165
(58) Field of Classification Search ................ 104/162, 104/165, 168, 88.01, 96; 198/465.3
See application file for complete search history.

(56) References Cited

U.S. PATENT DOCUMENTS

| | | | | |
|---|---|---|---|---|
| 2,947,263 A | * | 8/1960 | Vidmar | 104/168 |
| 3,479,238 A | * | 11/1969 | Stiegler et al. | 156/111 |
| 4,014,428 A | | 3/1977 | Ossbahr | |
| 4,456,117 A | | 6/1984 | Szczepanski | |
| 4,530,287 A | * | 7/1985 | Sticht | 104/168 |
| 4,712,484 A | | 12/1987 | Sticht | |
| 5,012,917 A | * | 5/1991 | Gilbert et al. | 198/465.2 |
| 5,067,413 A | * | 11/1991 | Kiuchi et al. | 104/168 |
| 5,213,195 A | | 5/1993 | Sticht | |
| 5,465,827 A | | 11/1995 | Nakagawa et al. | |
| 5,806,655 A | | 9/1998 | Tabler | |
| 6,176,367 B1 | | 1/2001 | Patrito | |
| 6,354,430 B1 | | 3/2002 | Oe | |
| 6,494,142 B2 | | 12/2002 | Masugaki et al. | |
| 6,843,365 B2 | | 1/2005 | Baker | |

FOREIGN PATENT DOCUMENTS

| | | |
|---|---|---|
| JP | 61-203016 A | 9/1986 |
| JP | 2-169406 A | 6/1990 |
| JP | 4-306162 A | 10/1992 |

* cited by examiner

*Primary Examiner*—S. Joseph Morano
*Assistant Examiner*—Daniel V Venne
(74) *Attorney, Agent, or Firm*—Standley Law Group LLP

(57) ABSTRACT

A modular friction drive system and method for use with a palletized conveyor. The drive system includes drive assemblies located at opposite sides of both a load end and unload end of the palletized conveyor. Each drive assembly comprises at least one drive unit and at least one take-up unit, which are connected by a drive belt. One or more idler units may reside between the drive unit(s) and take-up unit(s). Each drive assembly is provided with an actuating means for pressing the drive belt tightly against the side walls of associated conveyor pallets. Each of the drive unit, take-up unit, and idler unit is preferably modular in nature and can, therefore, be added to or removed from a drive assembly independently of the other unit(s).

22 Claims, 7 Drawing Sheets

FRICTION DRIVE SYSTEM AND METHOD FOR PALLETIZED CONVEYOR

BACKGROUND OF THE INVENTION

The present invention is directed to a novel drive system for a palletized conveyor. More particularly, the present invention is directed to a modular friction drive system for a palletized conveyor.

A palletized conveyor of the type relevant to the present invention generally includes a number of carriers (pallets) that glide over a series of free-turning rollers. The pallets are provided to transport various articles to a downstream position. Typically, there are a plurality of pallets associated with a single conveyor.

In a palletized conveyor system like that described above, neither the individual pallets or the underlying rollers are driven. Rather, the rollers turn freely in bearings or other similar supports. The pallets then move along the length of the conveyor by gliding over top of the rollers. The pallets are usually restrained against transverse movement by rails or a similar barrier.

Because neither the pallets themselves nor the rollers are driven, an external motive force must be applied to the pallets in order to move the pallets along the conveyor. This may be accomplished in several ways according to the known art, such as, for example, by means of an endless chain or belt located adjacent to the conveyor. In such an embodiment, the chain or belt may be equipped with a number of engaging cogs that contact the pallets and urge them along the conveyor as the chain or belt rotates. Alternatively, a plurality of driving wheels may be stationed along the length of the conveyor and positioned to make contact with a portion of each pallet as it traverses the conveyor. Such driving wheels may be individually driven or may be collectively driven—such as by a belt or chain coupled to a single drive motor.

Still other known drive systems make use of a single, or small number of drivers near the loading portion of the conveyor only. These drivers act to propel the pallets toward the opposite end of the conveyor. However, because palletized conveyors are often of considerable length, the drivers of such a system typically must impart a significant force to the pallets in order to provide enough velocity to propel the pallets along the entire length of the conveyor. Applying such an accelerating force, unfortunately, also causes an abrupt movement of the pallets and may upset the loads carried thereby. Further, the pallets are typically launched along the conveyor with significant gaps therebetween. This of course, is an inefficient use of conveyor space and also makes possible collisions between pallets that, for one reason or another, move along the conveyor at different velocities.

Often, these known systems further require the use of complex pivoting or rotating assemblies to ensure proper contact of the driving element(s) with the pallets. Such assemblies invite unnecessary maintenance and repair.

As can be gleaned from the foregoing discussion, it is also desirable to keep the individual pallets in contact with one another as they travel down the conveyor. This is advantageous for several reasons: such as to maximize transport efficiency and to avoid pallet collisions. It is also desirable to minimize the complexity and space consumed by the pallet drive system.

Known palletized conveyors and palletized conveyor drive systems are often deficient in one or more ways. For example, locating a drive chain or drive belt along the entire length of the conveyor consumes a great amount of space, as does locating a plurality of driven wheels along the length of the conveyor. Additionally, employing a plurality of individual drive wheels also makes maintaining contact between pallets quite difficult. Such systems also are not typically readily adaptable to changes in conveyor and/or pallet design, or to conveyor operation. Further, employing a single drive mechanism at one end of a palletized conveyor results in an inefficient use of conveyor space and facilitates undesirable pallet collisions.

Consequently, there is a need for a simplified and adaptable palletized conveyor drive system that meets the aforementioned needs/desires. A modular friction drive system of the present invention satisfies this need.

SUMMARY OF THE INVENTION

A friction drive system of the present invention allows for the controlled movement of pallets along a palletized conveyor—without requiring that a belt, chain or plurality of individual driven wheels be located along the entire length of the conveyor. Further, a friction drive system of the present invention allows for transfer of the pallets in a substantially abutting relationship, thereby avoiding large gaps or collisions between pallets. A friction drive system of the present invention is also modular in nature, thereby facilitating its adaptation to changes in pallet size, pallet load, and other conveyor characteristics.

A friction drive system of the present invention incorporates pairs of transversely opposed drive assemblies at each end, or substantially near each end, of the palletized conveyor (i.e., at the load and unload ends of the conveyor). Each drive assembly includes at least one driver unit and may also include one or more take-up units and/or idler units. All the present units are connected by a belt that engages a sprocket located on each unit. The belt contacts the sides of the pallets, and rotation of the belt by the drive unit(s) causes movement of the pallets along the conveyor.

In order to ensure that adequate friction is present between the belt and the pallets, at least the sprocket portion of each unit is driven against the pallet sides by means of an actuator, such as a pneumatic or hydraulic cylinder. The system of the present invention is designed such that at least the sprocket portion of each unit is linearly displaceable by its corresponding actuator.

The drive assembly at the load end of the palletized conveyor is responsible for propelling the pallets along the conveyor until the pallets reach the drive assembly at the conveyor's unload end. In order to eliminate the need to impart large accelerations to prevent gaps between the pallets, the unload drive assemblies preferably operate at a rotational speed that is slightly slower than that of the load-end drive assemblies. This arrangement acts as a brake of sorts, allowing the pallets to be transported along the conveyor in a substantially abutting arrangement, while still providing for movement of the pallets at the unload end of the conveyor.

A drive system of the present invention, unlike known drive systems, is also modular in nature. More particularly, each unit making up the drive system is self-sufficient. That is, each unit, whether it be a drive unit, a take-up unit, or an idler unit, operates autonomously. Each individual unit is also separately mounted to the floor or to a mounting base residing adjacent to the conveyor to maximize modularity. Consequently, if a unit must be replaced, only the defective unit need be removed. Similarly, depending on the particular drive unit affected, a defective drive unit may be removed from service without the need to deactivate the entire drive assembly. In this manner, maintenance may be postponed to a more convenient time. Further, a drive system of the present invention may be expanded or otherwise modified by simply adding or subtracting individual units, and/or by altering the collection or arrangement of individual units.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
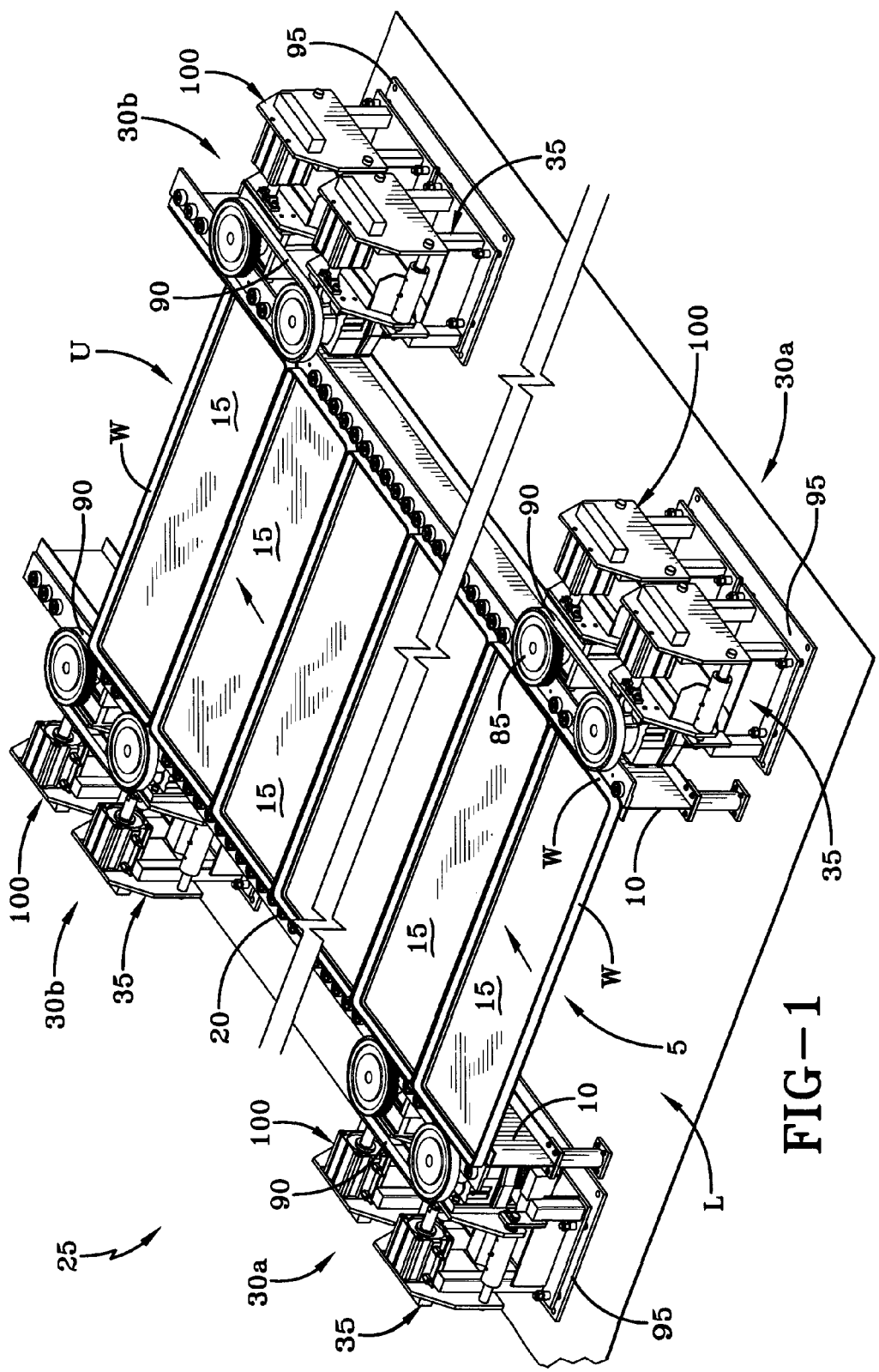
FIG. 1 is a perspective view of one embodiment of a friction drive system of the present invention installed to a typical palletized conveyor.
Figure 2:
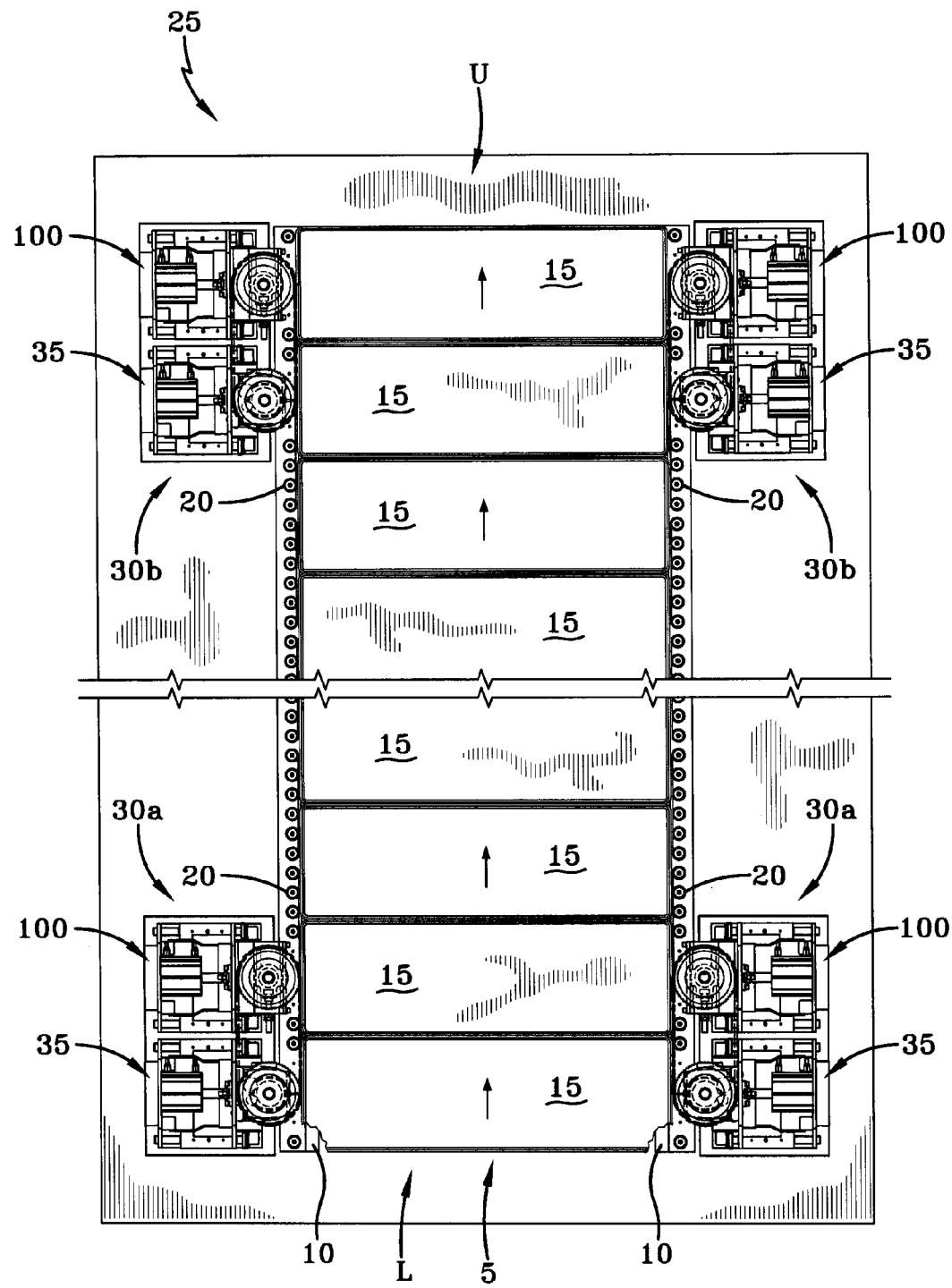
FIG. 2 is a top plan view of the friction drive system and palletized conveyor of FIG. 1.
Figure 3:
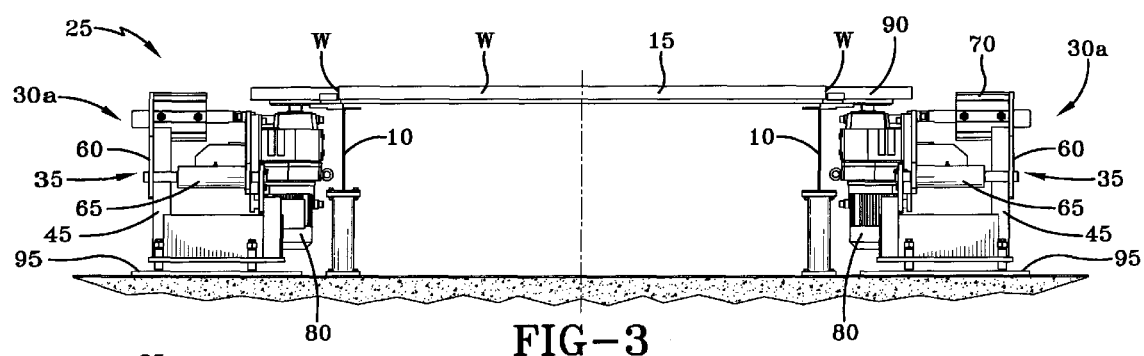
FIG. 3 is an end view of the friction drive system and palletized conveyor of FIG. 1.
Figure 4:
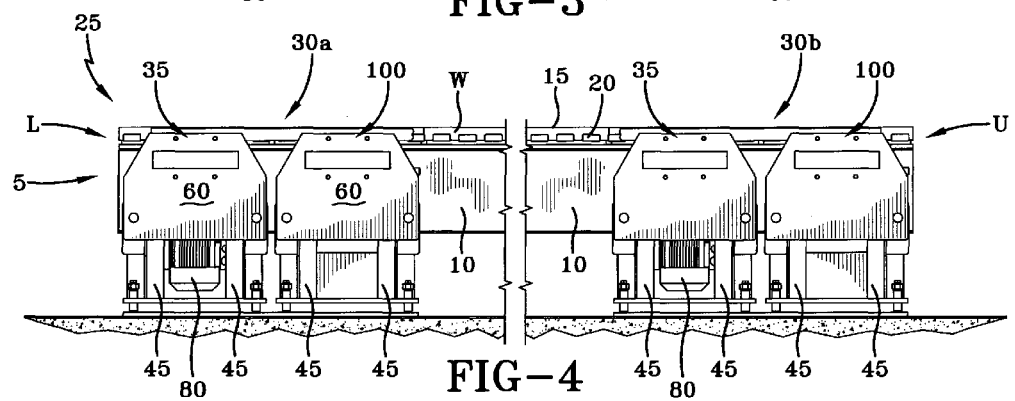
FIG. 4 is a side view of the friction drive system and palletized conveyor of FIG. 1.

One embodiment of a modular friction drive system 25 of the present invention is illustrated installed to a palletized conveyor 5 in FIGS. 1-4. A depicted in FIGS. 1-4, a drive system of the present invention generally includes a drive assembly at both a load end L and unload end U of the conveyor 5.

The particular palletized conveyor 5 depicted in FIGS. 1-4 includes a pair of elongated and transversely spaced frame members 10. Rollers (not shown for purposes of clarity) may extend between the frame members 10 or may reside only between a mating top surface of the frame members and the underside of the pallets 15 traveling along the conveyor 5.

The pallets 15 shown in this particular embodiment of the conveyor 5 are essentially rectangular trays having upwardly extending side walls. The pallets 15 are used to transport parts or other cargo along the conveyor 5. Transverse movement of the pallets 15 is typically limited or prevented by a number of idler rollers 20 that are located along the length of each conveyor frame member 10.

Each of the particular drive assemblies 30a, 30b depicted in FIGS. 1-4 includes only a drive unit 35 and a take-up unit 100, although other configurations are also possible. Each of the drive unit 35 and the take-up unit 100 includes a belt sprocket 85. A drive belt 90 wraps around the belt sprockets 85, thereby coupling the drive unit 35 to the take-up unit 100. The sprockets 85 and the drive belt 90 may be of various engaging configuration, such as the cogged configuration shown.

The sprockets 85 and belt 90 are positioned along side the conveyor 5 such that the belt passes between the side walls W of the pallets 15 and the idler rollers 20 attached to the frame members 10. Friction between the drive belt 90 and the pallet side walls W causes movement of the pallets 15 along the conveyor 5 in the direction of the arrow when the drive unit 35 is in operation. The take-up unit 100 acts to maintain tension in the drive belt 90. Passing the drive belt 90 between the idler rollers 20 and the pallets 15 helps to ensure that contact between the pallets and belt is maximized and may also help to increase friction between the belt and the pallet side walls W. The number of idler rollers 20 separated from the pallets 15 by the drive belt W can vary depending on conveyor design and/or the amount of separation between the drive and take-up units 35, 100.

Each of the drive unit 35 and take-up unit 100 are designed to be separately mounted to the floor or, as shown in FIGS. 1-4, to a mounting plate 95. The mounting plate 95 may be mounted to the floor or to an underlying machine base. This enhances the modularity of the friction drive system 25, as either the drive unit 35 or the take-up unit 100 can be easily removed from or installed to the mounting plate 95 (or to the floor). Further, although the mounting plate of the particular embodiment shown is designed to receive only two units, it can be appreciated that an expanded mounting plate may also be used, such that spare stations (installation locations) are readily available to receive additional drive or take-up units 35,100 if the drive assembly needs to be expanded. Idler units 135 (described below) may also be added to the drive assembly of FIGS. 1-4 in this manner. Alternatively, additional units can simply be mounted to the floor in systems employing such a mounting technique.

Figure 5:
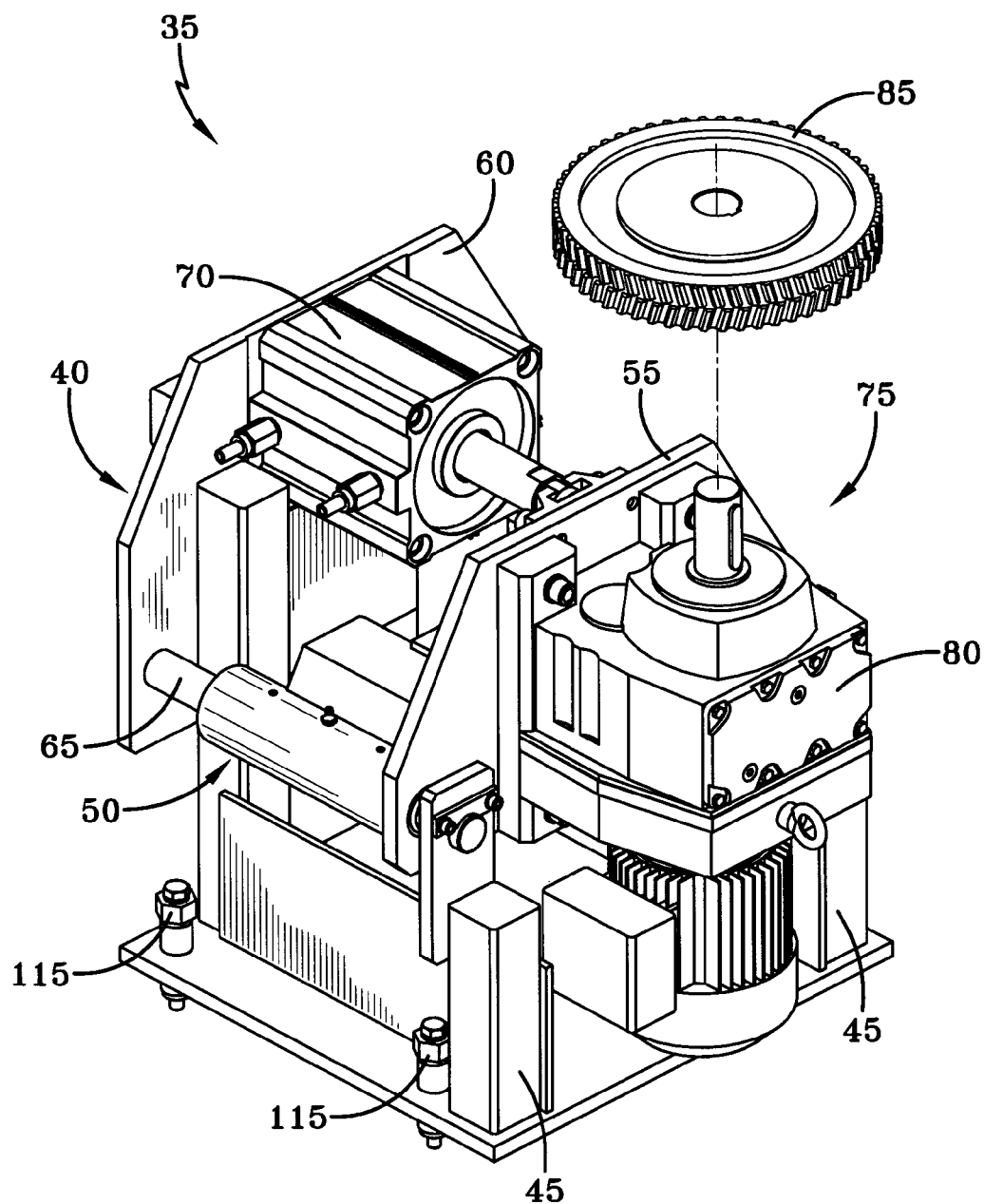
FIG. 5 is an enlarged perspective view of one embodiment of a drive unit of the present invention.

An enlarged view of the drive unit 35 of FIGS. 1-4 can be observed in FIG. 5. As can be seen, the drive unit 35 includes a frame assembly 40 having a fixed base portion 45 that supports a slide unit 50. The fixed base portion 45 secures the drive unit 35 to the mounting plate 95 (or floor) and helps raise the drive components 75 and belt sprocket 85 to the proper level to mate with the pallets 15. The slide unit 50 serves to support and move the drive components 75.

It will be understood by one skilled in the art that such a frame configuration could be accomplished in a number of ways. Consequently, the particular frame design illustrated in the drawing figures is to be considered exemplary only.

The slide unit 50 resides above and is connected to the base 45. The slide unit 50 facilitates linear displacement of the drive components 75 and belt sprocket 85 toward and away from the conveyor 5 and pallets 15. In the exemplary slide unit 50 shown, a fixed rear mounting plate 60 is secured along the rear of base 45. A front mounting plate 55 is coupled to the rear mounting plate 60 in a moving relationship. In this particular embodiment of the drive unit 35, the mounting plates 55, 60 are coupled to one another by a pair of guide rods 65. The guide rods 65 ensure proper linear movement of the front mounting plate 55 toward and away from the rear mounting plate 60, while substantially preventing transverse movement thereof. Such guide rods 65 typically include a linear bearing that allows the desired movement. As such guide rods 65 would be well known to one skilled in the art, no further detail need be provided herein.

Preferably, but not necessarily, the front mounting plate 55 also slides along the top surface of the base 45, thereby assisting with support of the front mounting plate and the associated components affixed thereto. The bottom face of the front mounting plate 55 may be designed to slide directly upon a top surface of the base 45. Alternatively, linear guide ways can be used or a slide block 67 or similar element may reside between the front mounting plate and the base. A low friction material such as nylon may also be employed to reduce sliding friction.

A linear actuator 70 also extends between the front and rear mounting plates 55, 60. The linear actuator 70 may take the form of a motor and ball screw or a pneumatic or hydraulic cylinder, for example. In the embodiment shown, the linear actuator 70 is a pneumatic cylinder. The body of the pneumatic cylinder 70 is secured to the rear mounting plate 60, with the piston rod thereof extending toward and affixed to the front mounting plate 55. When the drive unit is in operation, the pneumatic cylinder 70 acts to drive the front mounting plate 55 and its associated drive components 75 away from the rear mounting plate 60 and toward the conveyor 5 and pallets 15. The force exerted by the pneumatic cylinder 70 thereafter operates to maintain the drive belt 90 in proper contact with the side walls W of the pallets 15. Preferably, the force exerted by the linear actuator is regulated such that the drive belt 90 can be pressed against the pallet side walls W with a predetermined amount of force. In certain embodiments, the pneumatic cylinder or other linear actuator can also be used to retract the drive components 75 away from the conveyor 5 and pallets 15.

As can also be seen in FIG. 5, the drive components 75 include at least a drive motor 80 and the belt sprocket 85, which are attached to and move with the front mounting plate 55. The drive components may also include a gear box 84. The present invention is not limited to any particular type of drive motor. Rather, it is only necessary that the selected drive motor 80 can meet the load and duty requirements necessitated by the conveyor with which it will be used. Consequently, it is contemplated that the drive motor 80 may be any one of various known types of permanent magnet motors. For example, it is possible that the drive motor 80 may be an AC, DC brush, or brushless DC type permanent magnet motor. It may also be possible to make use of a pneumatic, hydraulic or other type of drive motor.

The drive motor 80 may be used alone, or it may be coupled to a gearbox as needed to provide for a useable output. Therefore, the drive components 75 may also include a gear box 84. As such, the belt sprocket 85 may be connected directly to the output shaft of the drive motor 80 or to the output shaft of a gear box 84, as shown.

Figure 6:
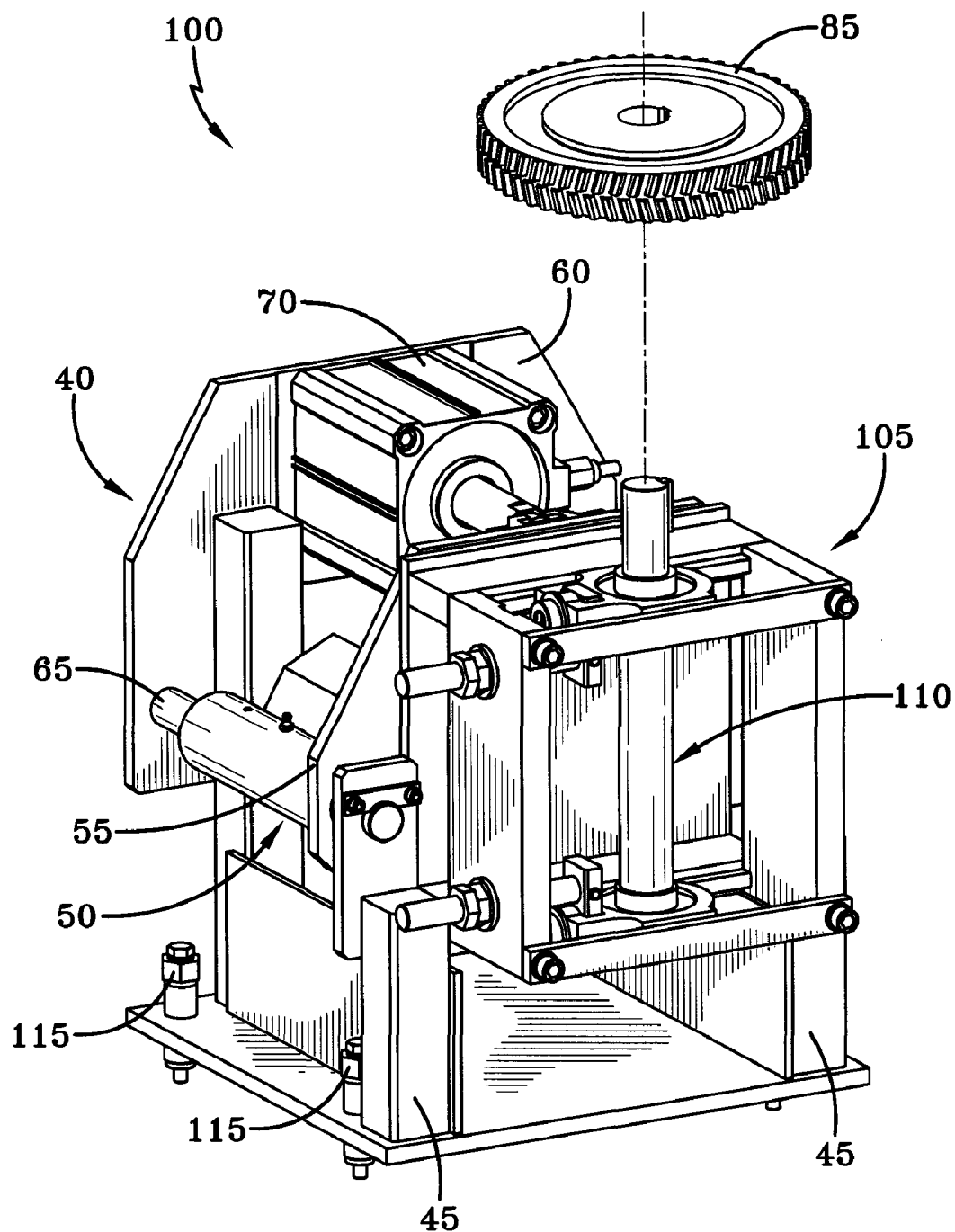
FIG. 6 is an enlarged perspective view of one embodiment of a take-up unit of the present invention.

An enlarged view of the take-up unit 100 of FIGS. 1-4 can be observed in FIG. 6. As can be seen, the take-up unit 100 makes use of substantially the same frame assembly 40 as does the drive unit 35. Consequently, the drive components 105 of the take-up unit 100 are linearly moveable toward and, possibly away, from the conveyor 5 and pallets 15 in the same manner as the drive components 75 of the drive unit 35.

The drive components 105 of the take-up unit 100 include a tensioning device 110 and a belt sprocket 85. The tensioning device 110 operates to provide a resistance to rotation of the drive unit 35, thereby helping to maintain tension in the drive belt 90. Such tensioning devices would be well known to one skilled in the art, and need not be described in detail herein. Preferably, but not necessarily, the position of the tensioning device 110 is also adjustable in a direction transverse to the movement of the front mounting plate 55 (i.e., along the length of the conveyor) so that belt stretch can be accounted for.

Preferably, but not necessarily, both the drive unit 35 and take-up unit 100 have adjusting feet 115. The adjusting feet 115 may assist with leveling each of the units 35, 100, and also allow for fine adjustments to the installed height of each unit. This can be useful to ensure optimum location of the drive belt 90 with the pallet side walls W.

Referring again to FIG. 1, it can be understood that opposing pairs of drive assemblies 30*a*, 30*b* are installed to both the load end L and the unload end U of the conveyor 5. The load end drive assemblies 30*a* shown in FIGS. 1-4 are responsible for moving the pallets 15 from the load end L of the conveyor 5 toward the unload end U of the conveyor—at least until they make contact with the drive assemblies 30*b* at the unload end. As such, it can be understood that the drive units 35 on one side of the conveyor rotate in a direction opposite that from those on the other side of the conveyor in order to impart a unidirectional moving force to the pallets 15.

As discussed earlier, the drive belt 90 extends around the belt sprockets 85 of the drive unit 35 and take-up unit 100 of each drive assembly 30. The linear actuator 70 present on each unit operates to force the drive belt 90 tightly against the pallet sidewalls W, thereby ensuring adequate friction exists to move the pallets 15. In the particular design shown, the drive belt 90 is also held against the pallet side walls W by one or more of the idler rollers 20 in front of which it passes.

The downstream, or unload end, drive assemblies 30*b* are generally of substantially the same configuration as the load end drive assemblies 30*a*, but may also be of different configuration in alternate embodiments of the present invention. For example, the unload end drive assemblies 30*b* may employ drive units and take-up units with different spacing, or the drive assemblies may also include idler units (described below). Obviously, a number of other configurations are also possible, and all such configurations are considered to be within the scope of the present invention.

Aside from assisting with movement of the pallets 15 toward an unload location, the unload end drive assemblies 30*b* also serve to maintain the pallets in a substantially abutting relationship as the pallets travel along the conveyor. To this end, the drive units at the unload end U of the conveyor typically rotate at a slower speed than do the drive units at the load end L of the conveyor 5. The reduced rotational speed of the unload end drive units allows the associated drive belts 90 to act as a brake of sorts, thereby slowing the linear velocity of the contacted pallets 15 to a velocity less than that possessed by their upstream counterparts. This generally allows the upstream pallets to maintain contact with their downstream neighbors, or at least functions to minimize gaps between neighboring pallets. Consequently, the pallets 15 proceed along the conveyor 5 in an orderly manner, without the undesirable accelerations and collisions commonly associated with known palletized conveyor drive systems.

Figure 7:
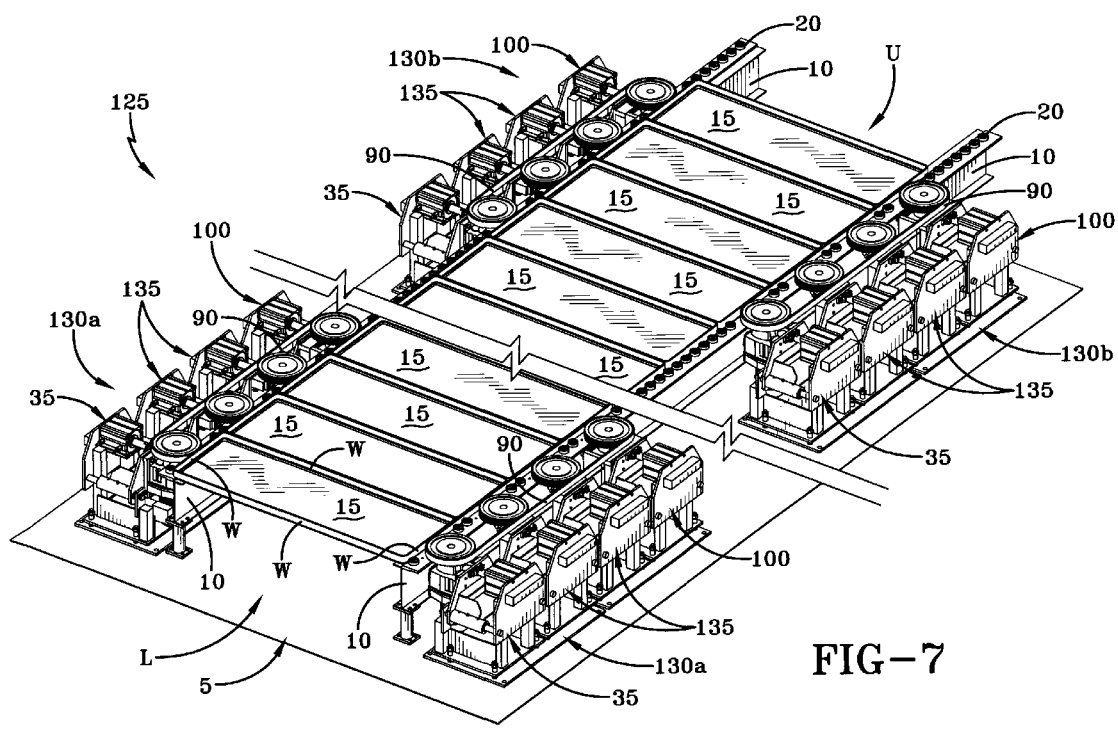
FIG. 7 is perspective view of a portion of an alternate embodiment of a friction drive system of the present invention installed to a typical palletized conveyor, wherein each of a drive unite, take-up unit and idler unit are present.

The modularity of a friction drive system of the present invention is well-illustrated by the embodiment of FIG. 7. In the embodiment of FIG. 7, a friction drive system 125 includes opposing pairs of load end and unload end drive assemblies 130*a*, 130*b* installed to the conveyor 5 of FIGS. 1-4. The drive assemblies 130*a*, 130*b* again include the drive unit 35 and take-up unit 100 described above, with a drive belt 90 extending around associated belt sprockets 85 thereof. However, unlike the drive system 25 of FIGS. 1-4, the drive assemblies 130*a*, 130*b* of this embodiment of the present invention each also include a number of intermediate idler units 135 that reside between the drive unit 35 and take-up unit 100.

Figure 8:
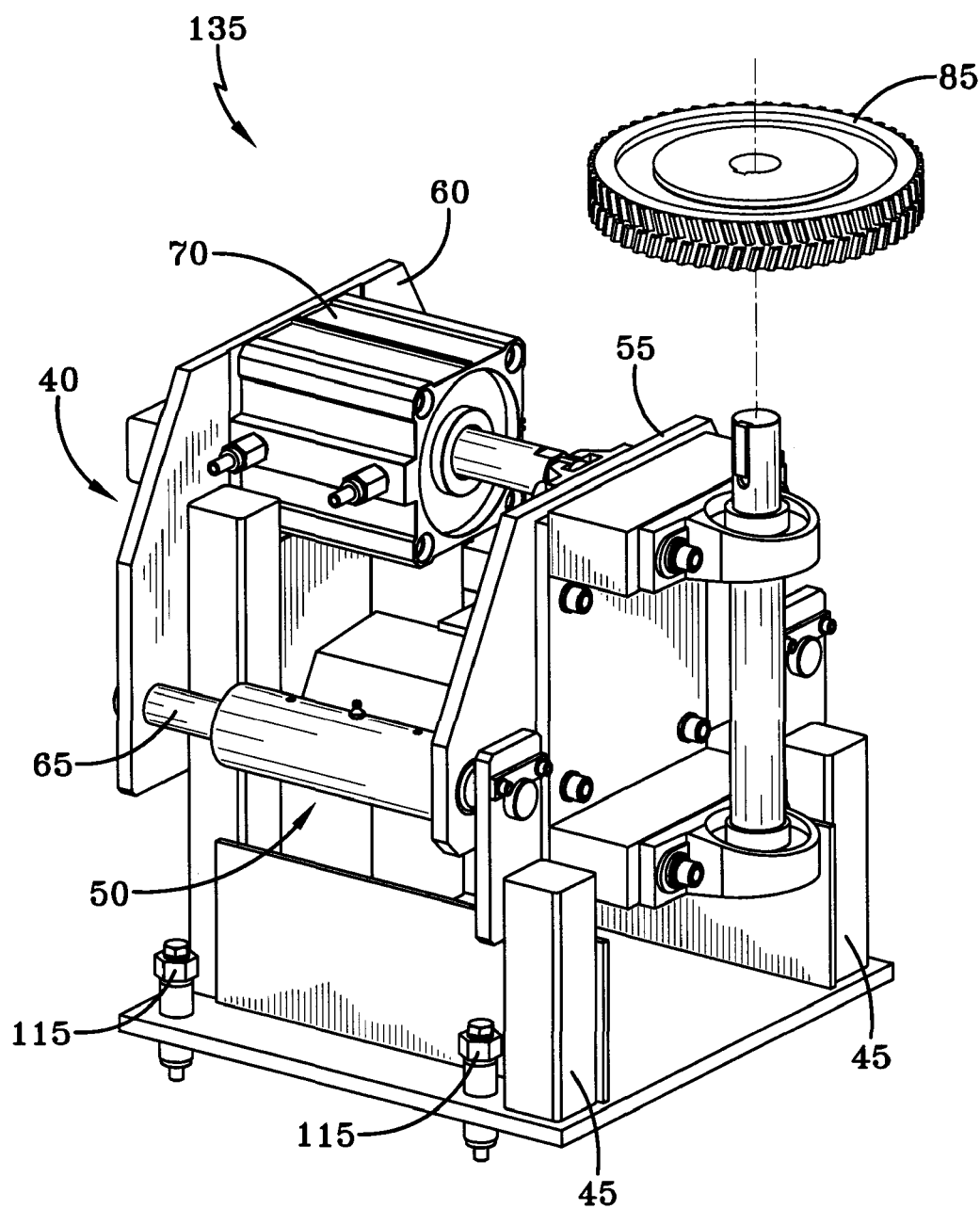
FIG. 8 is an enlarged perspective view of one embodiment of an idler unit of the present invention.

As can be best observed in FIG. 8, idler units 135 of the present invention generally share the same or substantially the same frame structure and slide unit as the drive units and take-up units with which they are used. An exemplary embodiment of acceptable frame/slide unit construction has been described above. The idler units 135 also generally share the same belt sprockets 85 as their counterpart drive and take-up units. However, the belt sprockets of the idler units 135 are generally free-wheeling, as opposed to being coupled to a drive motor or tensioning device. For example, the belt sprockets of the idler units 135 may be affixed to the front mounting plate using only a bearing.

The idler units 135 serve to ensure that adequate friction exists between the drive belt 90 and the pallet sidewalls W when a longer drive belt is used. Thus, like the drive units 35 and take-up units 100, the sprocket 85 of each idler unit 135 is forced against the pallet side walls by a linear actuator 70. This in turn forces the drive belt 90 against the pallet side wall W corresponding to the position of the idler unit sprocket.

When employing a friction drive system 125 like that shown in FIG. 7, the downstream, or unload end, drive assemblies 130b may again be the same or similar to the upstream, or load end, drive assemblies 130a. Alternatively, the unload end drive assemblies 130b may be somewhat different than the load end drive assemblies 130a. For example, the unload end drive assemblies 130b may employ a fewer or greater number of idler units than the load end drive assemblies 130a. Obviously, a number of other alternate configurations are also possible, and all such configurations are considered to be within the scope of the present invention.

Operation of the friction drive system 125 of FIG. 7 is the same as that described above with respect to the friction drive system 25 of FIGS. 1-4. For example, the drive belt 90 preferably again passes between a number of the idler rollers 20 and the pallet side walls W, and the unload end (downstream) drive units 130b operate at a slower rotational speed than do the unload end drive units 130a.

As shown in FIGS. 1-4 and 7, the various drive, idler or take-up units are attached to mounting plates 95 in pairs. It should be realized, however, that a three or more station mounting plate may also be used, as may a single station mounting plate, or no mounting plate. In any event, it can be seen that a friction drive system of the present invention can be easily modified as necessary to meet changing conveyor characteristics. For example, due to the increase in contact area between the drive belt 90 and the pallet side walls W, the embodiment of the friction drive system 125 shown in FIG. 7 is better-suited to moving larger or heavier pallets, or pallets carrying greater loads, than is the friction drive system 25 of FIGS. 1-4.

As can be seen, the size of a friction drive system of the present invention can be changed simply by adding or removing idler units 135. Moving capacity may also be increased by adding one or more additional drive units 35 and/or one or more take-up units 100 to a drive assembly. Gaps may be left between existing components to allow for installation of exiting components. Alternatively, components may be added to the end of those components already present, with the take-up unit(s) position being shifted as needed. Friction drive system size/capacity may be reduced in a similar manner.

While certain embodiments of the present invention are described in detail above, it should be realized by one skilled in the art that, due at least in part to the modular nature of the present invention, it is possible to accomplish other variations of a friction drive system that may differ from those shown and described with specificity herein, but that still fall within the scope of the present invention. As such, the scope of the present invention is not to be considered limited by such disclosure, and modifications are possible without departing from the spirit of the invention as evidenced by the following claims:

What is claimed is:

1. A friction drive system for a palletized conveyor, comprising:
    a pair of opposing drive assemblies residing along opposite sides of both a load and unload end of said palletized conveyor;
    each drive assembly including at least one drive unit having a drive motor adapted to rotate a drive belt;
    each drive assembly including at least one take-up unit having a tensioning device adapted to receive a drive belt;
    each drive assembly including a drive belt coupling said drive unit to said take-up unit;
    one or more idler units located between said at least one drive unit and said at least one take-up unit;
    a slide assembly associated with each idler unit and provided to facilitate movement of drive components of each idler unit toward said conveyor; and
    an actuator associated with each drive unit and each take-up unit for pressing said drive belt against pallets of said palletized conveyor;
    wherein said drive belts associated with said drive assemblies at said unload end of said palletized conveyor rotate at a slower speed than said drive belts associated with said drive assemblies at said load end of said palletized conveyor.

2. A method of driving pallets along a palletized conveyor in a controlled fashion, comprising:
    locating a pair of load end drive assemblies residing along opposite sides of a load end of said palletized conveyor;
    locating a pair of unload end drive assemblies residing along opposite sides of an unload end of said palletized conveyor;
    including in each drive assembly a self-contained drive unit having a drive motor that rotates a drive unit belt sprocket, a self-contained take-up unit having a tensioning device coupled to a take-up unit belt sprocket, and a drive belt coupling said drive unit belt sprocket to said take-up unit belt sprocket;
    associating a slide assembly with each drive unit and each take-up unit, each slide assembly including a linear actuator for linearly displacing drive components of an associated drive unit or take-up unit toward said palletized conveyor, thereby pressing a drive belt associated with each drive assembly against pallets of said palletized conveyor; and
    locating one or more idler units between said drive unit and said take-up unit of one or more of said drive assemblies, a slide assembly associated with each idler unit, each slide assembly including a linear actuator for linearly displacing drive components of said idler unit toward said palletized conveyor, thereby pressing a drive belt of an associated drive assembly against said pallets of said palletized conveyor;
    wherein said drive belts associated with said unload end drive assemblies rotate at a slower speed than said drive belts associated with said load end drive assemblies, thereby encouraging said pallets to travel along said conveyor in an abutting or nearly abutting arrangement.

3. The friction drive system of claim 1, wherein said drive motor is selected from the group consisting of an electric, pneumatic, and hydraulic motor.

4. The friction drive system of claim 1, wherein said drive belt passes between said pallets and a series of idler rollers associated with said palletized conveyor.

5. The friction drive system of claim 1, wherein said actuator is a pneumatic or hydraulic cylinder.

6. The friction drive system of claim 1, further comprising a slide assembly associated with each drive unit and each take-up unit and provided to facilitate movement of drive components of each of said drive unit and take-up unit toward said conveyor.

7. The friction drive system of claim 6, wherein said slide assembly comprises a pair of spaced apart mounting plates with a linear actuator extending therebetween, a rear mounting plate affixed to a lower frame portion, and a sliding front mounting plate carrying said drive components and moveable toward said conveyor by said linear actuator.

8. The friction drive system of claim 7, further comprising one or more linear guide rods extending between said mounting plates.

9. The friction drive system of claim 1, further comprising a slide assembly associated with each idler unit and provided to facilitate movement of drive components of each idler unit toward said conveyor.

10. The friction drive system of claim 1, wherein said one or both of said at least one drive unit and said at least one take-up unit are mounted to a base plate.

11. The friction drive system of claim 1, wherein said one or both of said at least one drive unit and said at least one take-up unit are mounted to a floor.

12. The friction drive system of claim 1, further comprising a drive unit belt sprocket and a take-up unit belt sprocket associated with each of said drive unit and said take-up unit, respectively.

13. The friction drive system of claim 12, further comprising a gear box coupling said drive motor to said drive unit belt sprocket.

14. The friction drive system of claim 12, wherein the position of said take-up unit belt sprocket is adjustable in a direction substantially parallel to the length of said conveyor in order to account for drive belt stretch.

15. The friction drive system of claim 1, further comprising leveling means for leveling and/or adjusting the height of said drive units and/or take-up units.

16. The friction drive system of claim 1, wherein said drive assemblies at said unload end of said conveyor are configured in the same manner as said drive assemblies at said load end of said conveyor.

17. The friction drive system of claim 1, wherein said drive assemblies at said unload end of said conveyor are configured differently from said drive assemblies at said load end of said conveyor.

18. The friction drive system of claim 1, wherein a gap exists between said drive units and said take-up units of one or more of said drive assemblies, said gap sufficient to allow for installation of one or more drive units, take-up units or idler units.

19. A modular friction drive system for a palletized conveyor, comprising:

a pair of load end drive assemblies residing along opposite sides of a load end of said palletized conveyor;

a pair of unload end drive assemblies residing along opposite sides of an unload end of said palletized conveyor;

each drive assembly including at least one self-contained drive unit having a drive motor that rotates a corresponding drive unit belt sprocket;

each drive assembly including at least one self-contained take-up unit having a tensioning device coupled to a corresponding take-up unit belt sprocket;

each drive assembly including a drive belt coupling said drive unit belt sprocket(s) to said take-up unit belt sprocket(s);

a slide assembly associated with each drive unit and each take-up unit, each slide assembly including a linear actuator for linearly displacing drive components of an associated drive unit or take-up unit toward said palletized conveyor, thereby pressing said belts against pallets of said palletized conveyor;

one or more idler units located between said at least one drive unit and said at least one take-up unit of one or more of said drive assemblies; and a slide assembly associated with each idler unit, said slide assembly provided to facilitate movement of drive components of said idler unit toward said conveyor and to thereby press an associated drive belt against pallets of said palletized conveyor;

wherein said drive units and/or said take-up units can be independently added to or removed from a drive assembly.

20. The friction drive system of claim 19, further comprising a gear box coupling said drive motor to said drive unit belt sprocket.

21. The friction drive system of claim 19, wherein the position of said take-up unit belt sprocket is adjustable in a direction substantially parallel to the length of said conveyor in order to account for drive belt stretch.

22. The friction drive system of claim 19, wherein said drive belts associated with said unload end drive assemblies rotate at a slower speed than said drive belts associated with said load end drive assemblies, thereby causing said pallets to travel along said conveyor in an abutting or nearly abutting arrangement.

* * * * *

UNITED STATES PATENT AND TRADEMARK OFFICE
CERTIFICATE OF CORRECTION

PATENT NO. : 7,500,435 B2
APPLICATION NO. : 11/278235
DATED : March 10, 2009
INVENTOR(S) : Bartlett, Jr. et al.

It is certified that error appears in the above-identified patent and that said Letters Patent is hereby corrected as shown below:

On the title page, item (75) Inventors:, please delete "Dave Dillard, Marysville, OH (US)" and insert -- David Dillard, Marysville, OH (US) --.

On the title page, item (75) Inventors:, please delete "Wayne Hemmelgam, Celina, OH (US)" and insert -- Wayne Hemmelgarn, Celina, OH (US) --.

Signed and Sealed this

Fourteenth Day of April, 2009

JOHN DOLL
*Acting Director of the United States Patent and Trademark Office*